(12) United States Patent
Sakabe et al.

(10) Patent No.: US 9,176,295 B2
(45) Date of Patent: Nov. 3, 2015

(54) STRANDED OPTICAL CABLE WITH CONNECTORS

(75) Inventors: Itaru Sakabe, Kanagawa (JP);
Kazuyuki Soma, Kanagawa (JP);
Tomoyuki Hattori, Kanagawa (JP);
Kenichiro Ohtsuka, Kanagawa (JP);
Masakazu Shigehara, Kanagawa (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 13/381,469

(22) PCT Filed: Jun. 9, 2011

(86) PCT No.: PCT/JP2011/063258
§ 371 (c)(1),
(2), (4) Date: Dec. 29, 2011

(87) PCT Pub. No.: WO2011/155563
PCT Pub. Date: Dec. 15, 2011

(65) Prior Publication Data
US 2012/0106906 A1 May 3, 2012

(30) Foreign Application Priority Data
Jun. 9, 2010 (JP) .................................. 2010-132094

(51) Int. Cl.
G02B 6/44 (2006.01)
G02B 6/38 (2006.01)

(52) U.S. Cl.
CPC .............. *G02B 6/448* (2013.01); *G02B 6/3885* (2013.01)

(58) Field of Classification Search
CPC ............................. G02B 6/3885; G02B 3/448
USPC ........................................................... 385/106
See application file for complete search history.

(56) References Cited

U.S. PATENT DOCUMENTS

| | | | | |
|---|---|---|---|---|
| 1,957,487 A | * | 5/1934 | Buckley et al. ............... | 174/115 |
| 4,143,942 A | * | 3/1979 | Anderson ..................... | 385/113 |
| 4,322,575 A | * | 3/1982 | Skipper ................... | 174/120 SR |
| 4,464,012 A | * | 8/1984 | Khoe et al. ..................... | 385/115 |
| 4,787,702 A | * | 11/1988 | Khalil ............................. | 385/102 |
| 4,902,092 A | * | 2/1990 | Grandy ............................ | 385/56 |
| 4,906,067 A | * | 3/1990 | Mayr et al. ..................... | 385/112 |
| 5,268,983 A | * | 12/1993 | Tatarka et al. ................. | 385/106 |
| 5,684,904 A | * | 11/1997 | Bringuier et al. ............. | 385/109 |

(Continued)

FOREIGN PATENT DOCUMENTS

| | | | | |
|---|---|---|---|---|
| CH | 473497 A | * | 5/1969 | |
| CN | 101248382 A | | 8/2008 | |

(Continued)

*Primary Examiner* — Peter Radkowski
(74) *Attorney, Agent, or Firm* — Drinker Biddle & Reath LLP (57) ABSTRACT

The stranded optical cable 10 includes a plurality of stranded multicore optical cables 12 and a cable sheath 16 covering the multicore optical cables 12, each multicore optical cable 12 including at least two of optical units 13 as a pair and a unit sheath 14 covering the optical units 13, each optical unit 13 being formed by bundling a plurality of optical fibers. And, parts of the cable sheath corresponding to both ends of the stranded optical cable 10 are removed to expose the multicore optical cables 12 certain lengths so that the optical connectors 21 are connected to the multicore optical cables 12, respectively.

7 Claims, 5 Drawing Sheets

(56) References Cited

U.S. PATENT DOCUMENTS

| | | | |
|---|---|---|---|
| 6,253,012 B1* | 6/2001 | Keller et al. | 385/109 |
| 6,707,972 B1* | 3/2004 | Larkin | 385/106 |
| 6,961,683 B2* | 11/2005 | Kodama et al. | 703/2 |
| 7,251,411 B1* | 7/2007 | Lu et al. | 385/147 |
| 7,590,320 B2* | 9/2009 | Herbst | 385/100 |
| 8,069,556 B2* | 12/2011 | Selbach | 29/755 |
| 2002/0076168 A1* | 6/2002 | Suematsu et al. | 385/80 |
| 2006/0088258 A1* | 4/2006 | Sasaki et al. | 385/114 |
| 2006/0120672 A1* | 6/2006 | Cody et al. | 385/86 |
| 2006/0269194 A1* | 11/2006 | Luther et al. | 385/78 |
| 2007/0212009 A1* | 9/2007 | Lu et al. | 385/135 |
| 2008/0085091 A1* | 4/2008 | Wells et al. | 385/134 |
| 2008/0193091 A1* | 8/2008 | Herbst | 385/111 |
| 2010/0014819 A1* | 1/2010 | Herbst | 385/100 |
| 2010/0210138 A1* | 8/2010 | Kuwahara et al. | 439/607.01 |
| 2010/0281684 A1* | 11/2010 | Selbach | 29/745 |
| 2011/0097047 A1* | 4/2011 | Fruhnert | 385/100 |

FOREIGN PATENT DOCUMENTS

| | | | | |
|---|---|---|---|---|
| CN | 101646964 A | | 2/2010 | |
| EP | 1 310 814 | | 5/2003 | |
| JP | 56-57006 | | 5/1981 | |
| JP | 01186778 A | * | 7/1989 | |
| JP | H05-060949 A | | 3/1993 | |
| JP | 7-128553 | | 5/1995 | |
| JP | 9-189831 | | 7/1997 | |
| JP | 09297226 A | * | 11/1997 | G02B 6/04 |
| JP | H10-048491 A | | 2/1998 | |
| JP | 11-344652 | | 12/1999 | |
| JP | 2001-221935 | | 8/2001 | |
| JP | 2002-267902 | | 9/2002 | |
| JP | 2003-202473 A | | 7/2003 | |
| JP | 2003-302558 A | | 10/2003 | |
| JP | 2004-061883 A | | 2/2004 | |
| JP | 2004-252368 | | 9/2004 | |
| JP | 2004260570 A | * | 9/2004 | |
| JP | 2007025233 A | * | 2/2007 | |
| JP | 2008-544300 | | 12/2008 | |

\* cited by examiner

STRANDED OPTICAL CABLE WITH CONNECTORS

TECHNICAL FIELD

The present invention relates to a multicore stranded optical cable with connectors as is employed for the connections between communication equipments which process information and data by high-speed transmissions.

BACKGROUND ART

Figure 5:
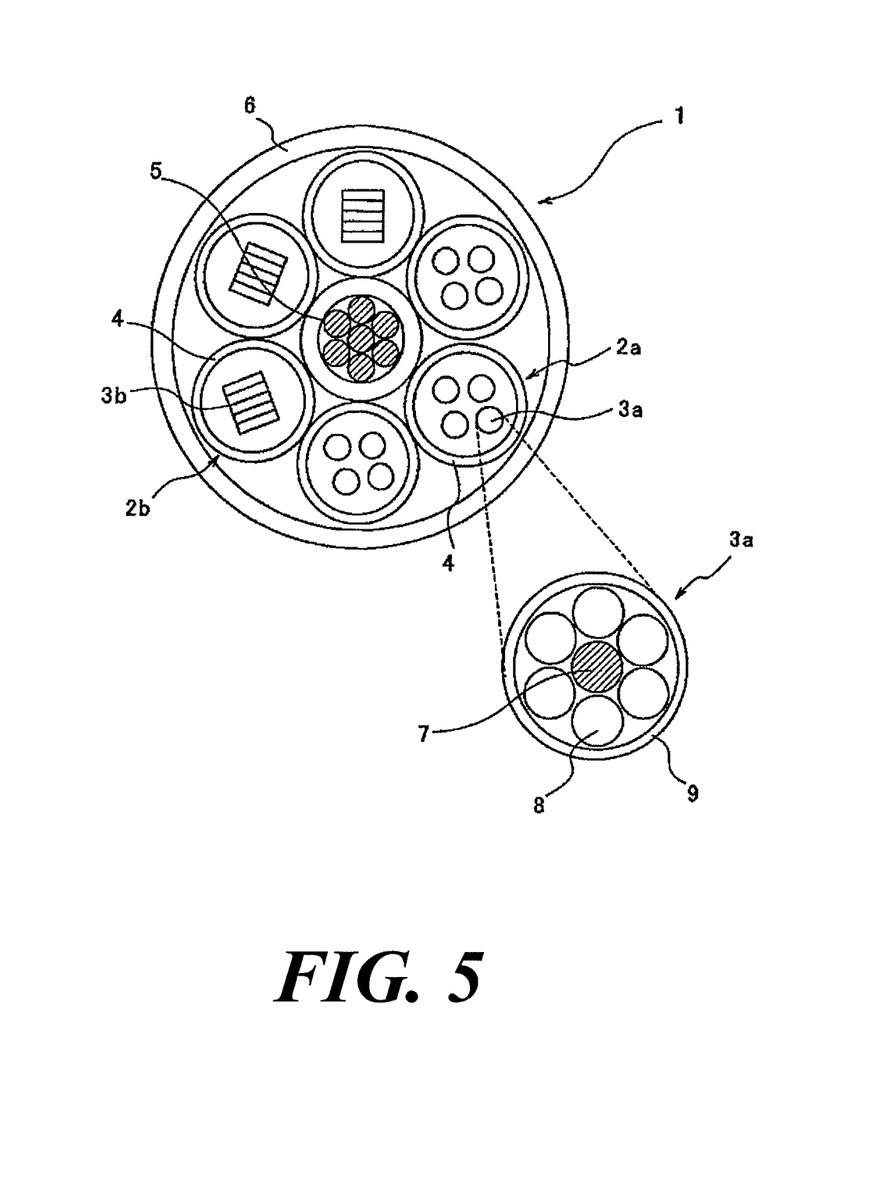
FIG. 5 illustrates the prior art.

For example, Patent Document 1 discloses a stranded optical cable in the formation of an optical communication network. As shown in FIG. 5, the stranded optical cable 1 is configured such that plural loose optical cables 2a or tape optical cables 2b are bundled around a tension member 5, and that the entirety is covered with a common cable sheath 6. Each of the loose optical cables 2a or tape optical cables 2b is covered with a unit sheath 4, and it is made a multicore optical cable of 20 cores or so. The loose optical cable 2a is such that plural optical units 3a are loosely accommodated in the unit sheath 4, and each optical unit 3a is such that plural optical fibers 8 are bundled round a tension member 7 and are then covered with a sheath 9. The tape optical cable 2b is formed by stacking and then bundling plural tape fibers 3b in each of which several optical fibers are united in the shape of a tape.

PRIOR-ART DOCUMENT

Patent Document

Patent Document 1: JP-H07-128553-A

SUMMARY OF THE INVENTION

Problem that the Invention is to Solve

In recent years, there has come into wide use "cloud computing" in an aspect wherein software items, data, etc. as have been managed/utilized by individual computers are provided through networks such as the Internet. For implementing optical connections between a server and multiple computers or between optical equipments, in a datacenter or the like which provides the software items, the data, etc., a high-speed transmission of at least 100 Gbps is handled by, for example, dividing an optical signal into 25 Gbps and transmitting the resulting signals by plural optical fibers. Here, for bidirectional optical signal transmission, instead of sharing one optical fiber, separate optical fibers are employed. Further, parallel transmissions are employed for the connections of the server and the like equipments.

That is, the number of the optical fibers to be used increases with the increases of information items and data signals and the high-speed transmissions thereof. Therefore, in order to built the server or the like information communication equipment in the datacenter or the like with optical wiring, the large number of the optical fibers will be used. Thus, a multicore optical cable needs to be used for internal connections. For example, the stranded optical cable as shown in FIG. 5, in which the large number of the optical fibers are accommodated, may be used.

However, when the large number of the optical fibers is used for forming an internal optical transmission line, the optical connection with wiring racks which is a part of an optical fiber wiring network or the optical connection between the information equipments such as the server becomes complicated, and the working condition, maintenance, etc. of the connections become problematic. Regarding, for example, the stranded optical cable as shown in FIG. 5, steel wires are usually used not only for the tension wire of the stranded optical cable but also for the tension member of the optical unit. Thus, while the rigidity of the cable is increased, the working condition in a small space, such as the interior of a building, is not good, and the stranded optical cable is not suited to the optical wiring within the building. Moreover, the stranded optical cable does not have an incombustibility.

An object of the present invention is to provide a stranded optical cable with connectors, in which the multicore optical connectors are previously attached in optical cable units, to both cable ends of certain lengths, which has no directionality for bending but has a flexibility facilitating the bending, which is laid or wired with a good working condition within a small space, and which facilitates maintenance and management.

Means for Solving the Problem

In order to solve the above problem, the present invention provides a stranded optical cable with connectors, the stranded optical cable including: a plurality of multicore optical cables which are stranded; and a cable sheath which covers the multicore optical cables, each multicore optical cable including at least two of optical units which are provided as a pair and a unit sheath which covers the optical units, each optical unit being formed by bundling a plurality of optical fibers, wherein parts of the cable sheath corresponding to both ends of the stranded optical cable are removed to expose the multicore optical cables certain lengths, so that optical connectors are connected to the multicore optical cables, respectively.

A tension fiber may be arranged at an interstitial part of the multicore optical cable along a lengthwise direction thereof. Boot portions of the optical connectors may be classified by color in units of the individual multicore optical cables. The unit sheath and the cable sheath may be formed of an incombustible resin.

Advantages of the Invention

According to the present invention, the stranded optical cable does not have any directionality for the bending of the optical cable but has the flexibility facilitating the bending, so that it is easily laid or wired within a building. Besides, the multicore optical connectors are previously attached in the optical cable units, to both the ends of the stranded optical cable as have the certain lengths, so that the operation of connecting the stranded optical cable to an optical wiring rack is facilitated, and the maintenance and management of the stranded optical cable become easy.

MODE FOR CARRYING OUT THE INVENTION

Figures 1A, 1B:
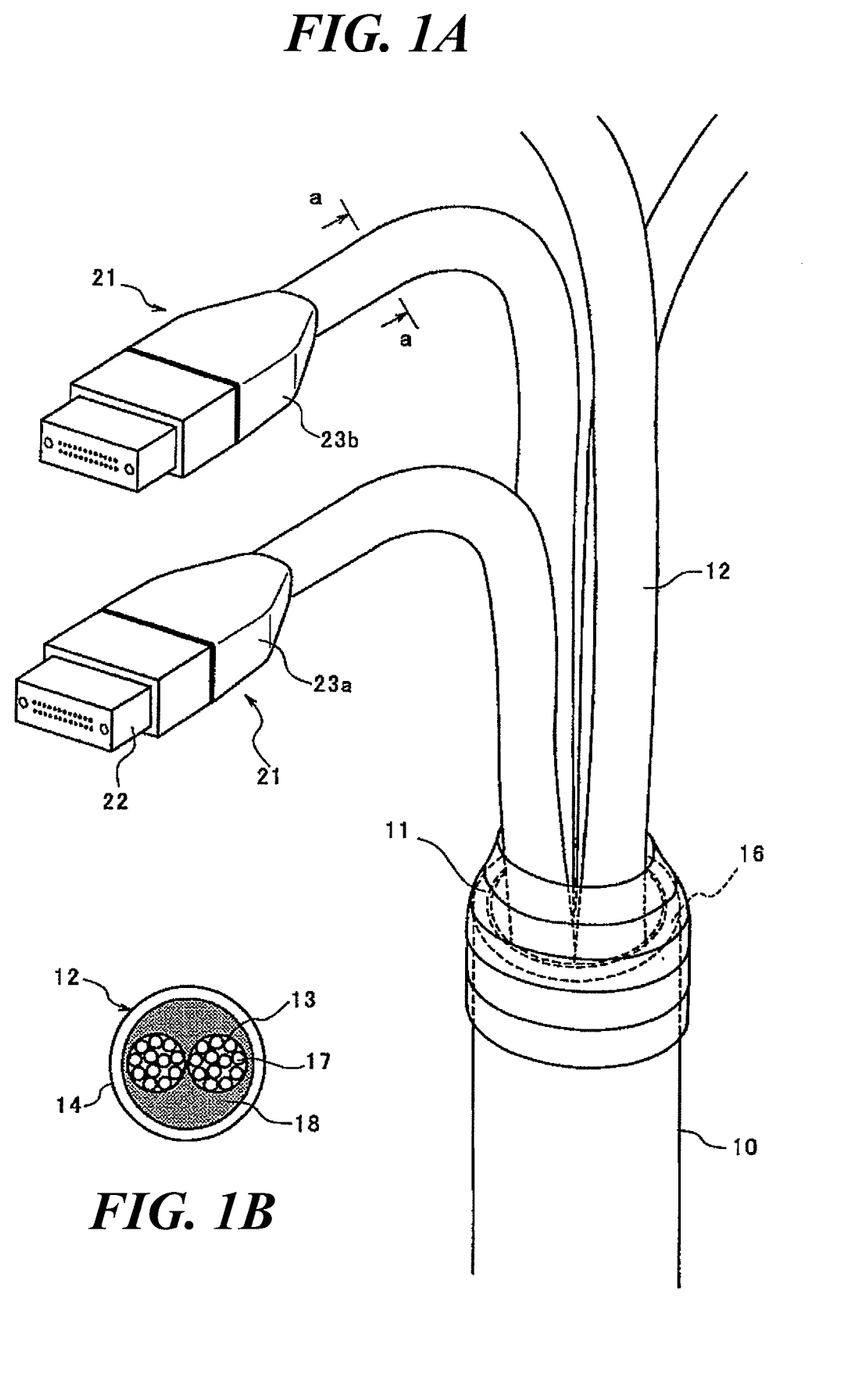
FIGS. 1A and 1B illustrate a stranded optical cable with connectors according to the present invention.

A stranded optical cable with connectors according to the present invention will be explained with reference to FIGS. 1A, 1B and 2. As shown in FIG. 1A, the stranded optical cable with connectors according to the present invention includes a stranded optical cable 10 in which plural multicore optical cables 12 are stranded, and it is configured such that multicore optical connectors 21 are attached to those distal ends of the plural multicore optical cables 12 which have been exposed by removing a cable sheath 16 at both the ends of the stranded optical cable 10 as have certain lengths. The length of the stranded optical cable 10 is set 300 m or less in consideration of the multistoreying of buildings in recent years. The excess length of the stranded optical cable 10 is absorbed by winding the intermediate part thereof, as necessary.

That root part of the stranded optical cable at which the multicore optical cables 12 are exposed is bundled by winding a bundling tape 11 or the like, whereby the multicore optical cables 12 are suppressed from forcibly widening the end part opening of the cable sheath 16 or from respectively moving freely. The details of the multicore optical cable 12 will be described later, but there is used the multicore optical cable configured such that, as has its section (section a-a) shown in FIG. 1B, at least two of optical units 13 in each of which optical fibers 17 in a comparatively small number (several-ten odd) are bundled are covered with a unit sheath 14 as a set, and the interstitial part of the set is filled up with a tension fiber 18.

When the dimensions, shape, etc. of a wiring rack are considered, a length on the order of 20 cm-2 m is suitable as the exposure length of the multicore optical cable 12. The multicore optical connector 21 described later is attached to the free end of the exposed multicore optical cable 12. The optical connectors 21 may preferably be attached in units of the multicore optical cables 12, but they may be attached in units of the optical units 13, depending upon the numbers of the cores of the optical fibers. The optical connectors 21 may be provided with identification functions such that the colors of boot portions 23a, 23b, provided for relaxing cable tensions behind connector body portions 22 are made different in units of the multicore optical cables 12.

Figure 2:
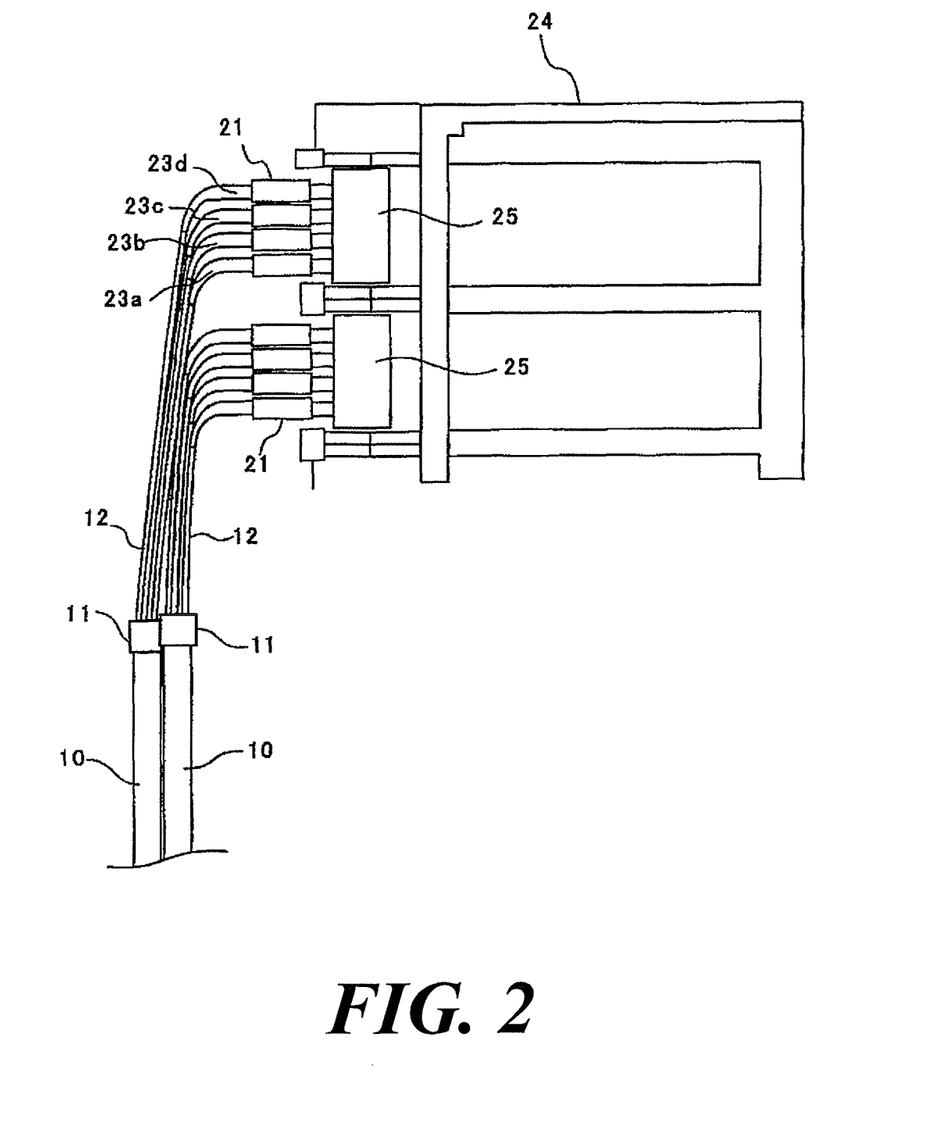
FIG. 2 illustrates a use example of the stranded optical cable with connectors according to the present invention.

As shown in FIG. 2, the above-configured stranded optical cable with the connectors is connected to a terminal device 25 disposed in the optical wiring rack 24 or the like. Since any tension member of high rigidity, such as a steel wire, is not arranged in the stranded optical cable 10 and the multicore optical cable 12, these optical cables are easily bendable, and since the connection to the terminal device 25 is done merely by joining the optical connector 21 attached beforehand, it can be easily performed.

The colors of the boot portions 23a-23d of the optical connectors 21 are made different, whereby the connection targets of the multicore optical cables 12 can be identified while suppressing mistake. When connecting to the terminal device 25, while external forces might be exerted on the multicore optical cables 12, the respective multicore optical cables 12 do not suffer from damages because they are protected by the unit sheaths 14. Also, when connecting to the terminal device 25, while tensile tensions might be exerted on the multicore optical cables 12, the interstitial parts inside the unit sheaths are filled up with the tension fiber 18, thereby functioning as tension members.

Figure 3A:
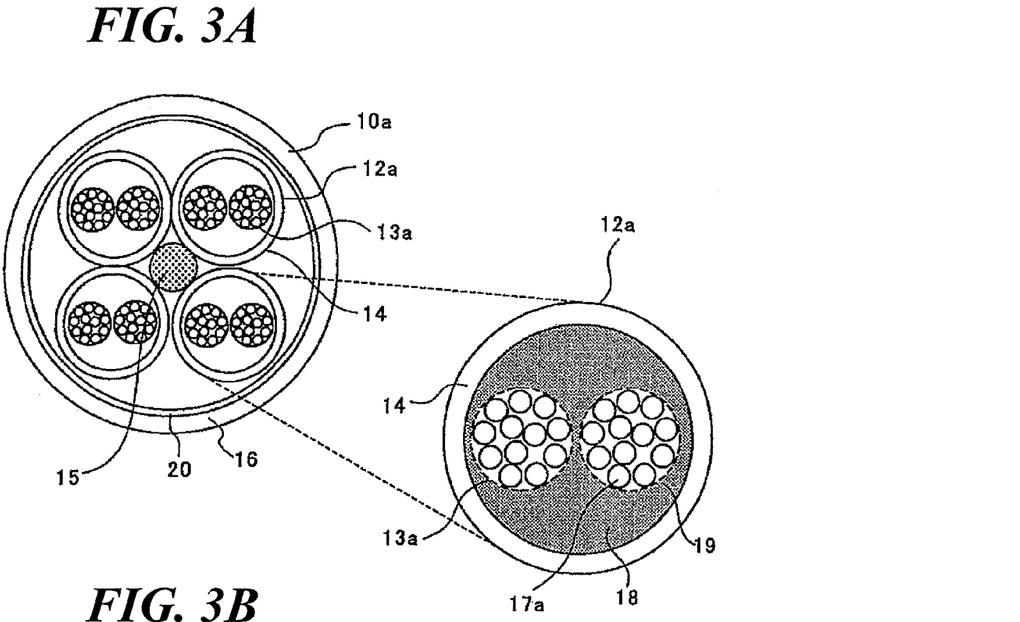
FIGS. 3A and 3B illustrate the stranded optical cable in the present invention.

As shown in FIG. 3A, for example, the stranded optical cable according to the present invention is configured such that plural (in an example of the figure, four of) multicore optical cables 12a are integrally covered with a cable sheath 16. For example, a center member 15 is formed by twisting a tension fiber such as an aramid fiber, the plural multicore optical cables 12a are twisted around the center member 15, and the outside of the multicore optical cables is covered with the cable sheath 16. A wrapping tape 20 is wound outside the twisted multicore optical cables 12a, whereby the cable sheath 16 formed by extrusion molding can be prevented from adhering with the unit sheaths 14 of the multicore optical cables 12a.

The multicore optical cable 12a is configured by, for example, pairing at least two of optical units 13a and then covering the optical units with the unit sheath 14. Regarding the two optical units 13a paired, one can be used as a transmission line for an up-link signal, and the other as a transmission line for a down-link signal. Regarding the number of the optical fibers which constitutes the optical unit 13a, for example, about 12 optical fibers are bundled as one unit, and about 24 optical fibers are used as all the optical units, but the number of the optical fibers may be larger or smaller. The optical units 13a which constitute the multicore optical cable 12a are not limited to one pair (two units), but two pairs (four units) of or more optical units may be included.

The optical unit 13a is formed by, for example, twisting plural (for example, 12) optical fibers 17a, or bundling and uniting the optical fibers with a bind member 19 or the like without twisting them. Alternatively, in bundling the plural optical fibers 17a, they may be united by a sheath based on extrusion covering, instead of the use of the bind member 19, or they may be further covered by the extrusion covering after they have been bundled by the bind member.

The pair of optical units 13a constituting the multicore optical cable 12a are twisted to each other so as to eliminate any directionality for bending, and the tension fiber 18 such as the aramid fiber may preferably be arranged at the interstitial part between the optical units and the unit sheath 14 along the lengthwise direction of a cable. The tension fiber 18 makes the multicore optical cable 12a circular in section, and provides a function as a tension member.

The stranded optical cable 10a can eliminate any directionality for bending, by twisting the plural multicore optical cables 12a which constitute this stranded optical cable (for example, four multicore optical cables having 96 optical fibers). In twisting the multicore optical cables 12a, the center member 15 may be used as described above, in order to arrange the array of the multicore optical cables 12a. Alternatively, the center member 15 may be omitted. The center member 15 may be formed of the tension fiber, so as to provide a function as the tension member of the stranded optical cable 10a.

The wrapping tape 20 is wound round the outer periphery of the twisted multicore optical cables 12a, and the cable sheath 16 is extrusion-molded outside the wrapping tape. The wrapping tape 20 prevents the cable sheath 16 from fusing and adhering to the multicore optical cables 12a and suppresses the drop of the resin to the interstitial part, whereby the outer periphery of the twisted multicore optical cables 12a can be approximated to a circular shape. These items may be omitted in a case where, in the extrusion molding of the cable sheath 16, the effects are possible by adjusting the pulling-down rate and extrusion resin pressure of the resin to-be-molded.

Figure 3B:
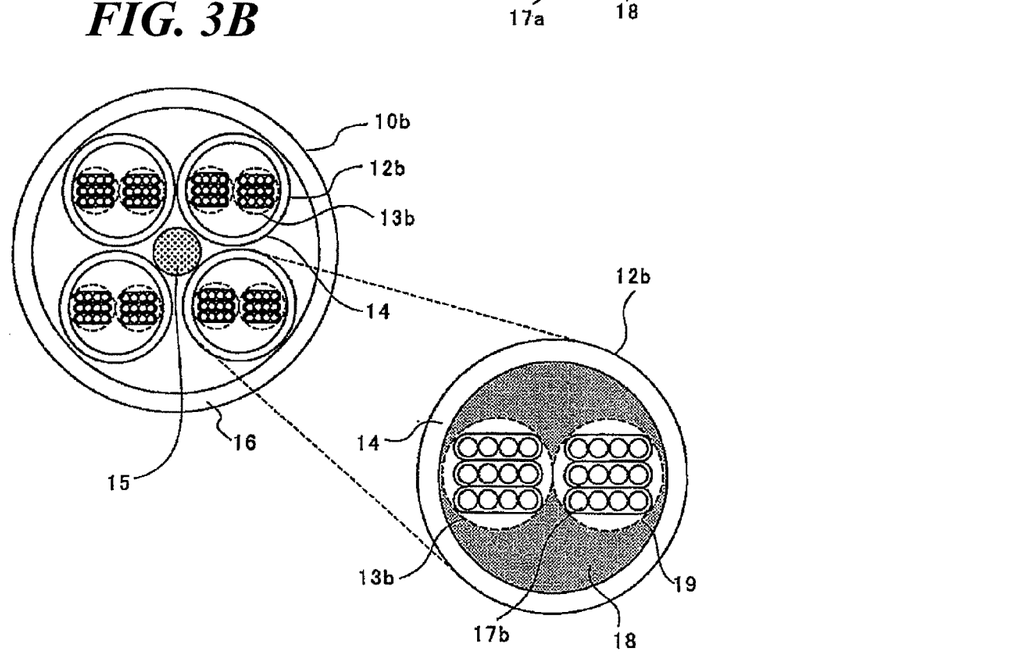

FIG. 3B shows an example in which tape fibers 17b each having plural optical fibers united in the shape of a tape are used for an optical unit. Also in this case, as in FIG. 3A, the optical unit 13b is formed by stacking the plural tape fibers 17b (for example, stacking three 4-core tape fibers). As in the case of the optical unit 13a, the optical unit 13b is formed by bundling and uniting the tape fibers with the bind member 19 or the like. However, the optical units 13b may be united by a sheath based on extrusion covering, instead of the use of the bind member 19, or they may be further covered by the extrusion covering after they have been bundled by the bind member.

A multicore optical cable 12b is configured by pairing at least two of optical units 13b and integrally covering the optical units with a unit sheath 14. Regarding the two optical units 13b paired, one can be used as a transmission line for an up-link signal, and the other as a transmission line for a down-link signal. Regarding the number of the optical fibers which constitutes the optical unit 13b, for example, about three 4-core tape fibers 17b are bundled as one unit, and about 24 cores are used as all the optical units, but the number of the fibers may be larger or smaller. The optical units 13b which constitute the multicore optical cable 12b are not limited to one pair (two units), but two pairs (four units) of or more optical units may be included.

The pair of optical units 13b constituting the multicore optical cable 12b are twisted to each other so as to eliminate any directionality for bending, and a tension fiber 18 such as an aramid fiber may preferably be arranged at the interstitial part between the optical units and the unit sheath 14 along the lengthwise direction of a cable. The tension fiber 18 makes the multicore optical cable 12b circular in section and provides a function as a tension member.

The stranded optical cable 10b can eliminate any directionality for bending, by twisting the plural multicore optical cables 12b (for example, four multicore optical cables having 96 optical fibers). In twisting the multicore optical cables 12b, a center member 15 may be used in order to arrange the array of the multicore optical cables 12b. Alternatively, the center member 15 may be omitted. The center member 15 may be formed of the tension fiber, so as to provide a function as the tension member of the stranded optical cable 10b.

The example in which the wrapping tape 20 is not used is shown in FIG. 3B, and in the extrusion-molding of a cable sheath 16, the pulling-down rate and extrusion resin pressure of a resin to-be-molded are adjusted, whereby the adhering of the cable sheath 16 with the unit sheath 14 of the multicore optical cable 12b and the drop of the resin to the interstitial part can be suppressed.

In a case where the stranded optical cable 10a or 10b is restricted to uses within a building, the unit sheath 14 of the multicore optical cable and the cable sheath 16 of the stranded optical cable may preferably have an incombustibility. Polyvinyl chloride is known as a resin for the sheath as has the incombustibility, but in case of using a thermoplastic resin of non-halogen type on account of an environmental problem, there is used a resin of styrene type, olefin type, polyester type, urethane type or the like as is doped with a flame retardant such as magnesium hydroxide.

The present invention consists in the optical cable which has the optical connectors at both the ends thereof and which is applied to the optical connection between a comparatively short distance, so that a multimode optical fiber (GI type) having a core diameter of 50 μm and a cladding outside diameter of 125 μm, for example, is used as the optical fiber 17a or the tape fiber 17b.

The properties of the optical cable may conform to "Telcordia GR-409 issue2" and "ICEA-596", and may satisfy them. Concretely, the following conditions may be satisfied:

(1) Loss: At most 0.4 dB.

(2) Shock resistance: Measured in conformity with "Section 7.20 in ICEA-596", and an impulsive force of at least 2.94 N·m.

(3) Tensile strength: Conforming to "Section 7.22 in ICEA-596".

(4) Bending flexibility: Measured in conformity with "Section 7.19 in ICEA-596", and a loss increment at a wavelength of 1300 nm is at most 0.4 dB in a case where the optical cable is wound 25 revolutions around a sheave which has a diameter of either larger value of 150 mm and 20 times the cable diameter.

(5) Heat cycle test: Heat cycle test at 0° C.-70° C. is conducted in conformity with "Section 7.18 in ICEA-596", and the loss increment at the wavelength of 1300 nm is at most 0.6 dB/km.

Figure 4:
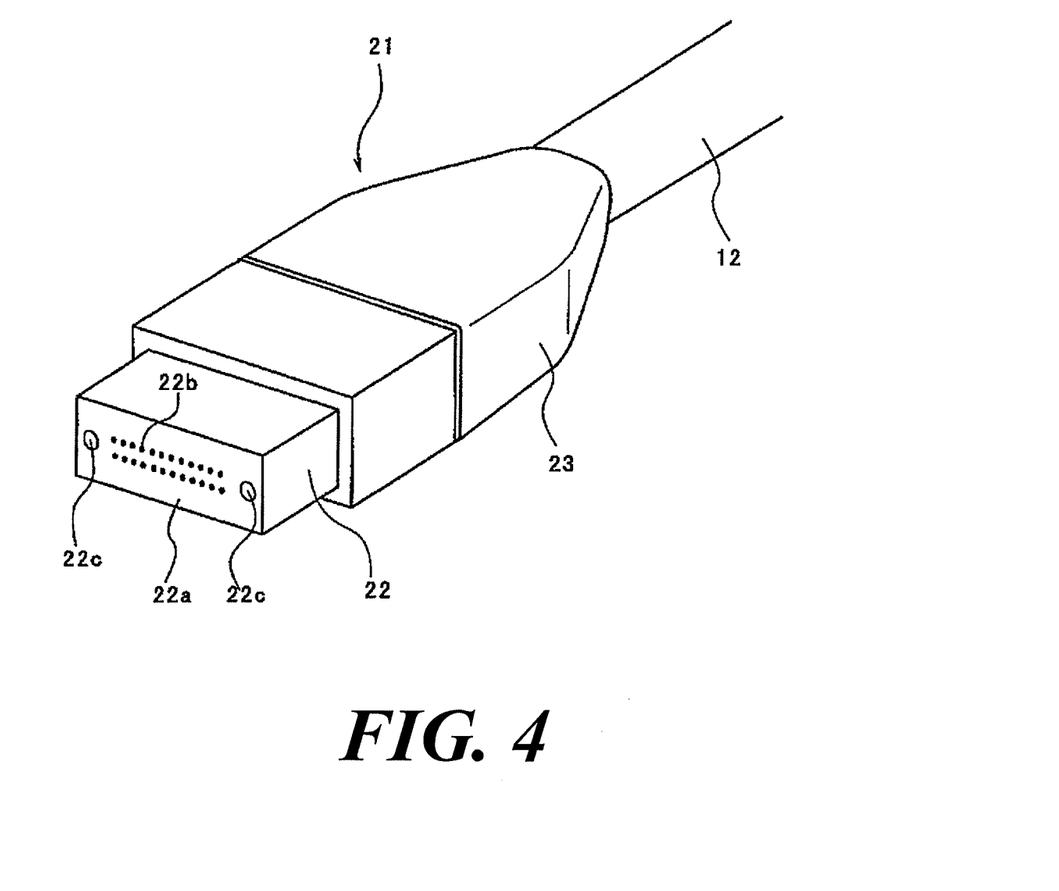
FIG. 4 illustrates a multicore optical connector in the present invention.

As the optical connector 21 attached to the optical cable, there can be employed a multicore MPO connector in which an MT structure is a base structure as shown in FIG. 4. An example shown in FIG. 4 is a 24-core optical connector which is formed of a two-stage array, and it includes a connector body portion 22, and a boot portion 23 which is made of an elastic material and which introduces the multicore optical cable 12 behind the body portion. At the front face 22a of the connector body portion 22, the individual optical fibers are arrayed at a certain pitch, and fiber apertures 22b at which the ends of the optical fibers are exposed are formed.

The multicore optical cable 12 which is connected to the optical connector 21, has 24 fibers. The multicore optical cable 12 consists of the two optical units, and the number of the optical fibers included in each optical unit is 12. The optical connector 21 is configured such that the 12 optical fibers are connected in two stages. The 12 optical fibers which are connected in one stage, are included in one optical unit. That is, the optical fibers are arrayed in parallel for the respective optical units, and the optical fibers included in the different optical units are connected in the different stages of the optical connector 21.

Since the number of the optical fibers connected to the optical connector 21 is 12 per optical unit, the optical fibers within the optical unit have their colors or patterns made different so as to be identifiable. The combinations of the colors or patterns for the optical fibers may be common in the different optical units.

Guide holes 22c for positioning with the opposite connector are formed on both the sides of the connector body portion 22, and the optical connector is connected with the opposite connector by inserting guide pins (not shown) into the guide holes 22c, whereby the joint positions between the connectors can be adjusted with high precision. The front face 22a of the connector body portion 22 is obliquely polished in a state where the optical fibers are insertedly fastened and fixed into the fiber apertures 22b, whereby the ends of the optical fibers are made certain slant faces, and the reflection of signal light can be suppressed.

The above-configured stranded optical cable with connectors is easily bendable because it does not include any rigid wire material such as a steel wire (tension wire or tension member) or a resin material (slot) within the cable. Moreover, any of the optical unit, the multicore optical cable and the stranded optical cable does not have a directionality for bending, and the handling condition and working condition of the cable are good together with the bendability as mentioned above. The optical connectors are previously attached in multicore optical cable units, so that connection operations are easy even when the number of the optical fibers is large, and any connection mistake can be avoided by providing the connector with the identification condition of the cable.

While the present invention has been described in detail and with reference to the specified embodiments, it is obvious to those skilled in the art that various alterations and revisions can be made without departing from the spirit and scope of the invention. The present application is based on Japanese Patent Application No. 2010-132094 filed on Jun. 9, 2010, the contents of which are incorporated here for reference.

DESCRIPTION OF REFERENCE NUMERALS AND SIGNS 10, 10a, 10b . . . stranded optical cables, 11 . . . bundling tape, 12, 12a, 12b . . . multicore optical cables, 13, 13a, 13b . . . optical units, 14 . . . unit sheath, 15 . . . center member, 16 . . . cable sheath, 17, 17a . . . optical fiber, 17b . . . tape fiber, 18 . . . tension fiber, 19 . . . bind member, 20 . . . wrapping tape, 21 . . . optical connector, 22 . . . connector body portion, 23 . . . boot portion, 24 . . . optical wiring rack, 25 . . . terminal device.

The invention claimed is:

1. A stranded optical cable with connectors, the stranded optical cable comprising:
a center member formed from an aramid fiber;
a plurality of multicore optical cables which are stranded around the center member, each multicore optical cable including:
only two optical units, each optical unit including a plurality of optical fibers being bundled; and
a unit sheath which covers the optical units; and
a cable sheath which covers the center member and the multicore optical cables,
wherein parts of the cable sheath corresponding to both ends of the stranded optical cable are removed to expose the multicore optical cables to certain lengths, and a root side of exposed parts of the multicore optical cables is bundled with wound bundling tape, and optical connectors are connected to the multicore optical cables, respectively, and
wherein, at an end face of each optical connector, the plurality of optical fibers are aligned into two stages such that the optical fibers of each optical unit are aligned into one of the two stages.

2. The stranded optical cable of claim 1, wherein a tension fiber is arranged at an interstitial part of the multicore optical cable along a lengthwise direction thereof.

3. The stranded optical cable of claim 1, wherein boot portions of the optical connectors are classified by color in units of the individual multicore optical cables.

4. The stranded optical cable of claim 1, wherein the unit sheath and the cable sheath are formed of an incombustible resin.

5. The stranded optical cable of claim 1, wherein in each optical unit, the plurality of optical fibers are twisted and are bundled by a bind member.

6. The stranded optical cable of claim 1, wherein each multicore optical cable further includes a tension fiber which fills up within the unit sheath.

7. The stranded optical cable of claim 1, wherein each multicore optical cable further includes a tension fiber which fills up between the unit sheath and the bundle of the plurality of optical fibers, but does not fill up an area between each of the individual optical fibers.

* * * * *